United States Patent
Kwon et al.

(10) Patent No.: US 7,130,160 B2
(45) Date of Patent: Oct. 31, 2006

(54) METHOD AND APPARATUS FOR A MICRO-ACTUATOR PROVIDING THREE-DIMENSIONAL POSITIONING TO A SLIDER IN A HARD DISK DRIVE

(75) Inventors: Haesung Kwon, San Jose, CA (US); Michael Sullivan, Fremont, CA (US); Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 520 days.

(21) Appl. No.: 10/757,238

(22) Filed: Jan. 13, 2004

(65) Prior Publication Data
US 2005/0152072 A1    Jul. 14, 2005

(51) Int. Cl.
*G11B 5/56* (2006.01)
(52) U.S. Cl. .................. 360/294.7; 360/294.4
(58) Field of Classification Search ............. 360/294.7, 360/294.4, 294.3, 294.6, 294.5
See application file for complete search history.

(56) References Cited

U.S. PATENT DOCUMENTS

| | | | |
|---|---|---|---|
| 6,501,625 B1* | 12/2002 | Boismier et al. | 360/294.7 |
| 6,570,730 B1* | 5/2003 | Lewis et al. | 360/294.7 |
| 6,590,748 B1* | 7/2003 | Murphy et al. | 360/294.4 |
| 6,611,399 B1* | 8/2003 | Mei et al. | 360/234.7 |
| 6,950,266 B1* | 9/2005 | McCaslin et al. | 360/294.4 |

\* cited by examiner

*Primary Examiner*—Robert S. Tupper
(74) *Attorney, Agent, or Firm*—GSS Law Group; Earle Jennings

(57) ABSTRACT

The present invention includes a micro-actuator assembly. The micro-actuator assembly includes a planar micro-actuator and a vertical micro-actuator. The planar micro-actuator provides at least one planar micro-actuator arm for coupling to a slider. The vertical micro-actuator couples with the planar micro-actuator arm. The planar micro-actuator arm supports moving the slider in a planar direction. The vertical micro-actuator supports moving the slider, through the micro-actuator arm, in a vertical direction. The planar micro-actuator may include two planar micro-actuator arms. It is preferred that at least one of the micro-actuators include a piezoelectric device. The vertical micro-actuator preferably includes a bulk piezoelectric device for cost reasons. The vertical micro-actuator may include a thermoelectric device supporting vertical slider movement. The invention includes manufacturing head gimbal assemblies, actuator arms, voice coil actuator assemblies, and hard disk drives. The hard disk drives, actuator assemblies, actuator arms, and head gimbal assemblies, are products of these processes.

28 Claims, 7 Drawing Sheets

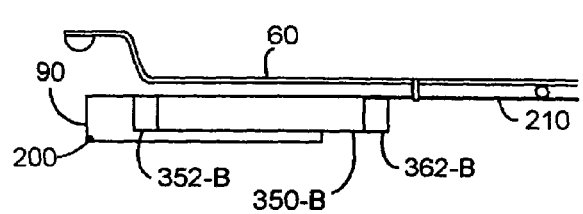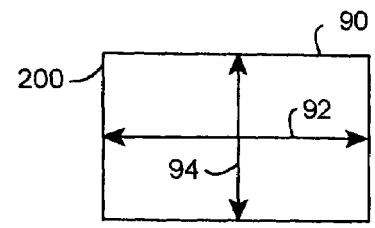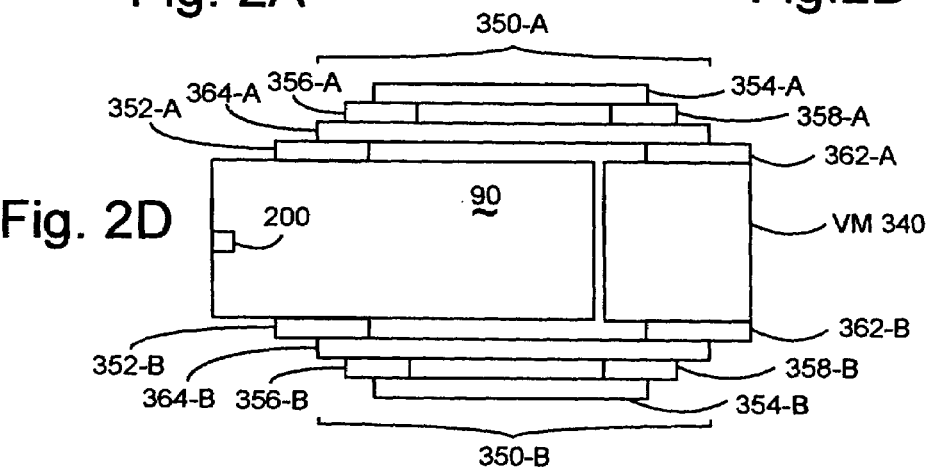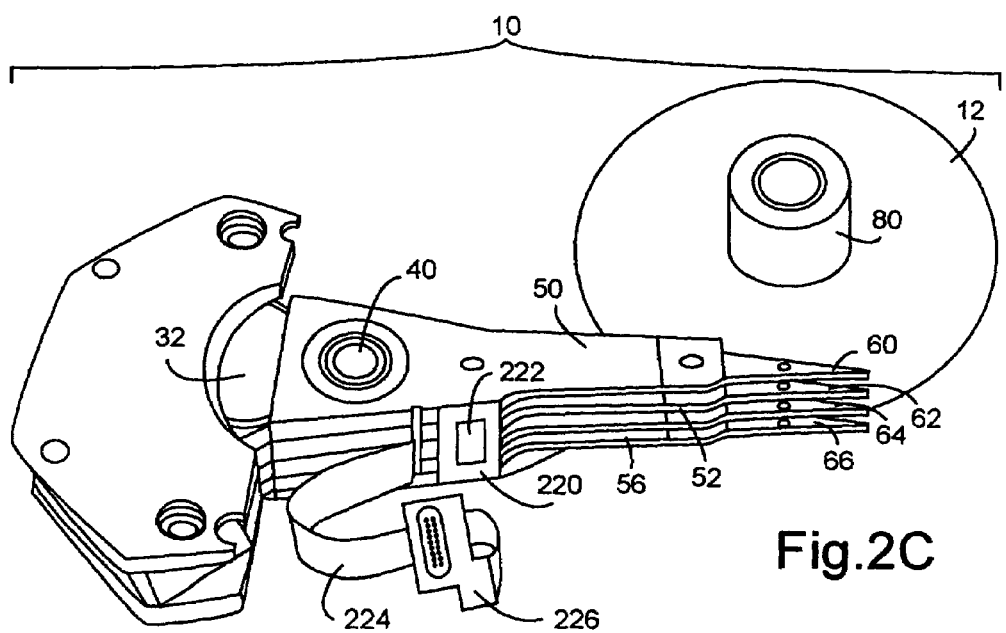

METHOD AND APPARATUS FOR A MICRO-ACTUATOR PROVIDING THREE-DIMENSIONAL POSITIONING TO A SLIDER IN A HARD DISK DRIVE

BACKGROUND OF THE INVENTION

1. Field of the Invention

The present invention relates generally to micro-actuators positioning sliders in a hard disk drive and, more particularly, to a micro-actuator capable of three-dimensional positioning of a slider.

2. Background Information

Modern hard disk drives may have one or more disks. Each disk may have two disk surfaces in use. The hard disk drives also include a servo controller that drives a voice coil actuator to position a read-write head near a track on the surface of a rotating disk. The read-write head communicates with the servo controller, providing feedback, which is used in controlling the read-write head's positioning near the track. The read-write head is embedded in a slider, which floats on a thin layer of air, known as an air bearing, a very short distance above the rotating disk surface.

The trend in the hard disk drive industry is to increase the areal density of the rotating disk surfaces. This is usually achieved by decreasing the flying height of the read-write head above the rotating disk surface, thus reducing the air bearing. Currently read-write heads fly at about 10 nanometers (nm) from the rotating disk surfaces.

There are problems with flying the read-write heads and sliders so near to the rotating disk surfaces. Occasionally, the read-write heads can contact the disk surface, which tends to reduce the reliability of the data stored on the disk, and possibly damage the read-write head. Contact between the read-write heads and the disk surface they access needs to be minimized to insure the reliability of the hard disk drive.

A voice coil actuator typically includes a voice coil, which swings at least one actuator arm in response signals from the servo controller. Each actuator arm includes at least one head gimbal assembly typically containing a read-write head embedded in a slider. Each disk surface in use has an associated slider, coupled to an actuator arm. The head gimbal assembly couples to a load beam coupled to the actuator arm in the voice coil actuator.

Today, the bandwidth of the servo controller feedback loop, or servo bandwidth, is typically in the range of 1.1 K Hz. Extending servo bandwidth increases the sensitivity of the servo controller to drive the voice coil actuator to finer track positioning. Additionally, it decreases the time for the voice coil actuator to change track positions. However, extending servo bandwidth is difficult, and has not significantly improved recently. As areal densities increase, the need to improve track positioning increases.

One answer to this need involves integrating a micro-actuator into each head gimbal assembly. These micro-actuators are devices typically built of piezoelectric ceramic materials, often including lead, zirconium, and tungsten. The piezoelectric effect generates a mechanical action through the application of electric power. The piezoelectric effect of the micro-actuator, acting through a lever between the slider and the actuator arm, moves the read-write head over the tracks of the rotating disk surface.

The micro-actuator is typically controlled by the servo-controller through one or two wires. Electrically stimulating the micro-actuator through the wires triggers mechanical motion due to the piezoelectric effect. The micro-actuator adds fine positioning capabilities to the voice coil actuator, which effectively extends the servo bandwidth. In the single wire approach, the servo-controller provides a DC (direct current) voltage to one of the two leads of the piezoelectric element. The other lead is tied to a shared ground. In the two wire approach, the servo-controller drives both leads of the piezoelectric element of the micro-actuator.

A problem arises when integrating micro-actuators into hard disk drives with multiple disk surfaces. Each of the micro-actuators requires its leads to be controlled by the servo-controller. These leads are coupled to wires, which must traverse the main flex circuit to get to the flexure. The flexure provides electrical coupling to the leads of the micro-actuator.

The main flex circuit constrains many components of the voice coil actuator. If the shape or area of the main flex circuit is enlarged, changes are required to many of the components of the actuator arm assembly and possibly the entire voice coil actuator. Changing many or most of the components of an actuator arm assembly, leads to increases in development expenses, retesting and recalibrating the production processes for reliability, and inherently increases the cost of production.

The existing shape and surface area of the main flex circuit has been extensively optimized for pre-existing requirements. There is no room in the main flex circuit to run separate control wires to each micro-actuator for multiple disk surfaces. This has limited the use of micro-actuators to hard disk drives with only one active disk surface.

What is needed is a way to minimize the time that the read-write heads fly close to the rotating disk surfaces they access. What is further needed, is a way to integrate micro-actuators into a hard disk drive with multiple disk surfaces, using the existing surface area and shape of the main flex circuit.

BRIEF SUMMARY OF THE INVENTION

The present invention includes a micro-actuator assembly that includes a planar micro-actuator and a vertical micro-actuator. The planar micro-actuator provides at least one planar micro-actuator arm for coupling to a slider, and supports movement of the slider in a planar direction, essentially parallel to a rotating disk surface. The vertical micro-actuator couples with the planar micro-actuator arm, and supports movement of the slider through the micro-actuator arm in a vertical direction, essentially perpendicular to the planar direction.

The planar micro-actuator preferably includes two leads that provide the slider movement in the planar direction, when electrically stimulated. The vertical micro-actuator includes two leads that provide the slider movement in the vertical direction, when electrically stimulated. It may be preferred that one of the vertical micro-actuator leads be tied to a common ground. The common ground may be provided by the flexure to which the micro-actuator assembly is coupled.

It is preferred that the planar micro-actuator include two planar micro-actuator arms supporting the slider movement in the planar direction. It is also preferred that at least one of the micro-actuators include a piezoelectric device. The vertical micro-actuator preferably includes a bulk piezoelectric device. It may be preferred that the vertical micro-actuator be a multi-layer piezoelectric device to reduce the voltage requirements in stimulating the micro-actuator.

The vertical micro-actuator may include a thermoelectric device supporting the vertical slider movement.

The invention also includes a method of manufacturing head gimbal assemblies including the micro-actuator assemblies, actuator arms including the head gimbal assemblies, voice coil actuator assemblies including the actuator arms, and hard disk drives including the voice coil actuator assemblies. The invention includes the hard disk drives, actuator assemblies, actuator arms, and head gimbal assemblies, as products of these processes.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 2A shows a head gimbal assembly with the micro-actuator assembly of FIGS. 1A and 1C coupled with the slider as in FIGS. 1B and 1D;

FIG. 2B shows a bottom view of the slider of FIGS. 1B, 1D, and 2A defining the primary axis and secondary axis, as well as showing a second example location of the read-write head;

FIG. 2C shows a voice coil actuator including the slider of FIG. 2A and the flex circuitry of the invention;

FIG. 2D shows the micro-actuator assembly coupling the slider with two micro-actuator arms as in FIG. 1B, with each micro-actuator arm including a piezoelectric device;

DESCRIPTION OF THE PREFERRED EMBODIMENTS

The following description is provided to enable any person skilled in the art to make and use the invention and sets forth the best modes presently contemplated by the inventors for carrying out the invention. Various modifications, however, will remain readily apparent to those skilled in the art, since the generic principles of the present invention have been defined herein.

As shown in FIGS. 1A, 1B, 2D, and 7, the present invention includes a micro-actuator assembly comprising a planar micro-actuator 300, and a vertical micro-actuator 340. The planar micro-actuator 300 provides at least one planar micro-actuator arm 350-B for coupling 352-B to a slider 90, as shown in FIGS. 1B, 1D, 2A, and 7. The vertical micro-actuator 340 couples 362-B with the planar micro-actuator arm 350-B.

The planar micro-actuator 300 preferably includes two planar micro-actuator arms 350-A and 350-B, that supports movement of the slider 90 in the planar direction, as shown in FIGS. 1A, 1B, 2D, and 7. The vertical micro-actuator 340 also preferably couples 362-A with the planar micro-actuator arm 350-A.

The planar micro-actuator arms 350-A and/or 350-B support movement of the slider 90 in a planar direction as shown in FIGS. 2B and 2C. Planar motion, as used herein, will refer to movements essentially parallel to the rotating disk surface 12 of FIG. 2C. Planar motion can be simply seen as parallel to the bottom face of the slider 90 when the rotating disk surface 12 is essentially flat, as shown in FIG. 2B.

Figure 1A:
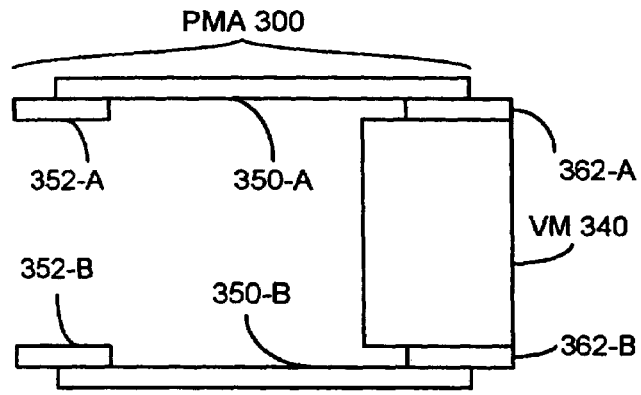
FIG. 1A shows a bottom view of a micro-actuator assembly of the invention, including a planar micro-actuator with two planar micro-actuator arms, coupled to a vertical micro-actuator.
Figure 1B:
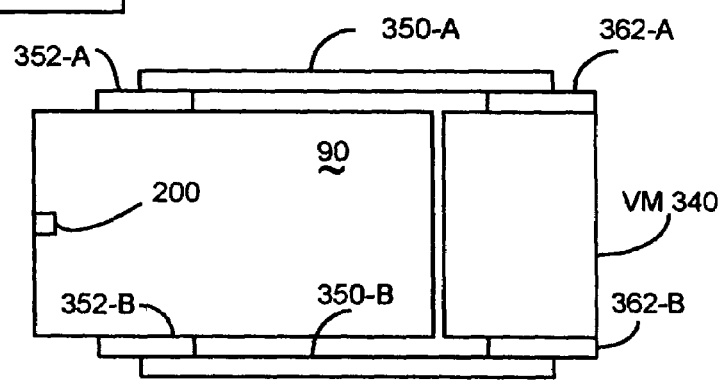
FIG. 1B shows a bottom view of the micro-actuator assembly of FIG. 1A coupling with a slider.
Figure 1C:
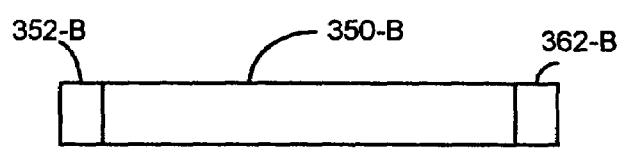
FIG. 1C shows a side view of the micro-actuator assembly of FIG. 1A.
Figure 1D:
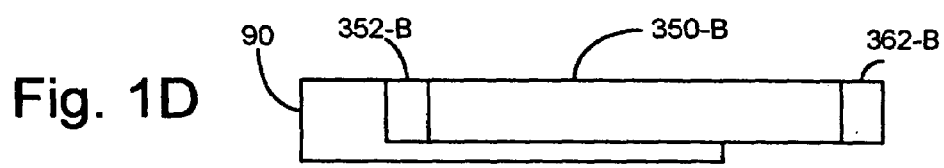
FIG. 1D shows a side view of the micro-actuator assembly of FIG. 1A coupling with the slider as in FIG. 1B.
Figure 1E:
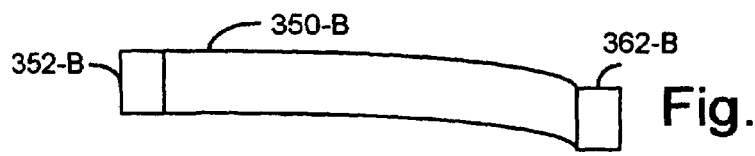
FIG. 1E shows the micro-actuator assembly of FIG. 1C moving the slider coupling in the vertical direction of up, away from a rotating disk surface.
Figure 1F:
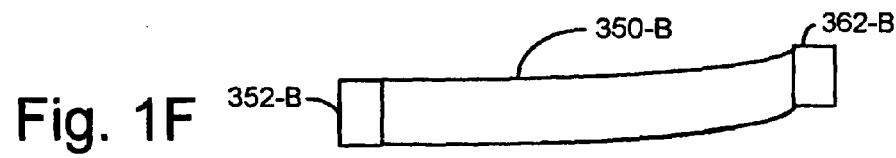
FIG. 1F shows the micro-actuator assembly of FIG. 1C moving the slider coupling in the vertical direction of down, toward the rotating disk surface.

The vertical micro-actuator 340 supports movement of the slider 90 through the micro-actuator arm(s) 350-B, and preferably, also 350-A, in a direction essentially perpendicular to the planar direction as shown in FIGS. 1C–1F. FIG. 1C shows the micro-actuator assembly of FIG. 1A at a rest position. FIG. 1E shows the micro-actuator assembly bending up. FIG. 1F shows the micro-actuator assembly bending down.

Figure 3:
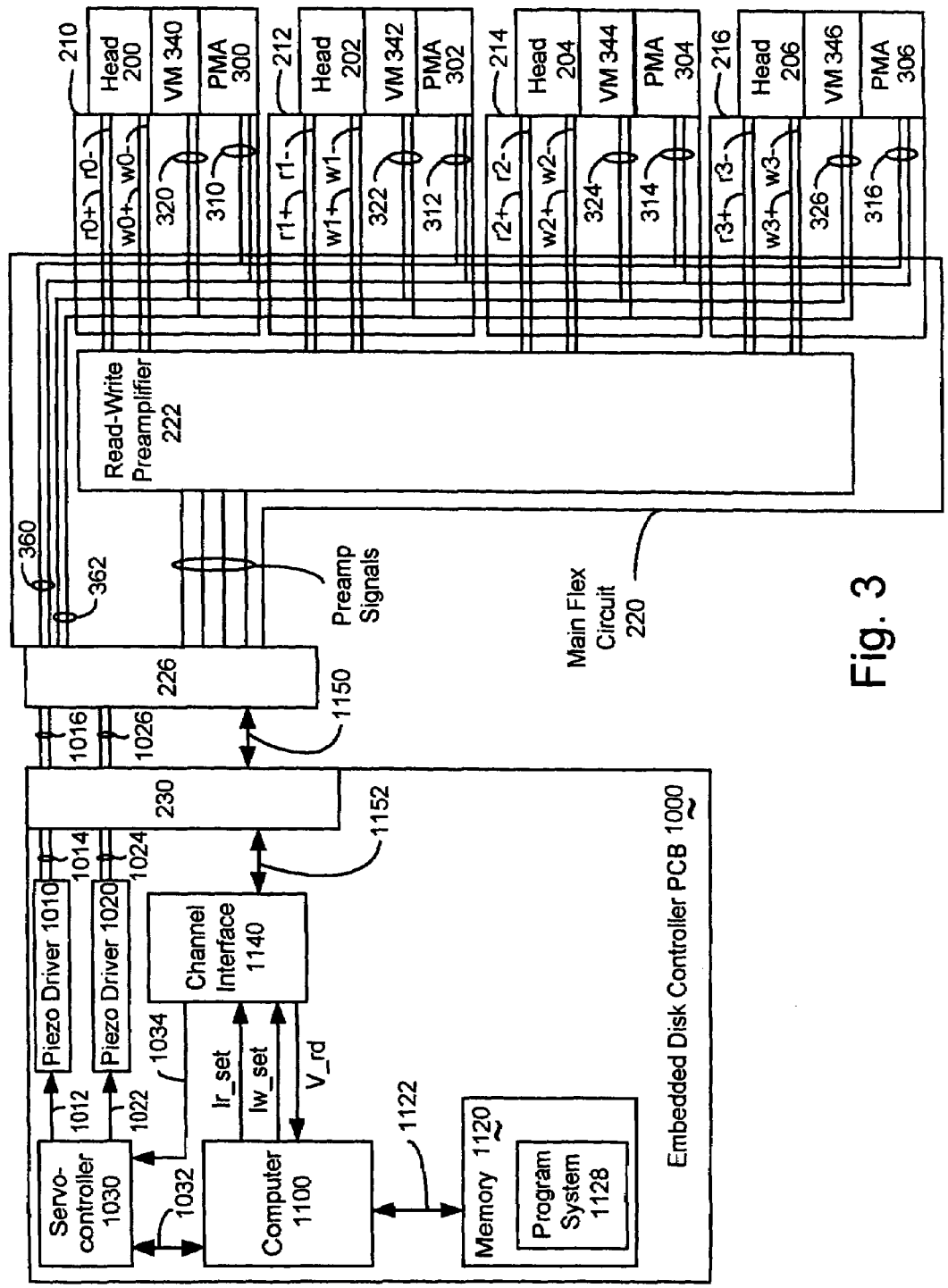
FIG. 3 shows the communication between the head gimbal assemblies of FIGS. 2A and 2C and the servo-controller.
Figure 4:
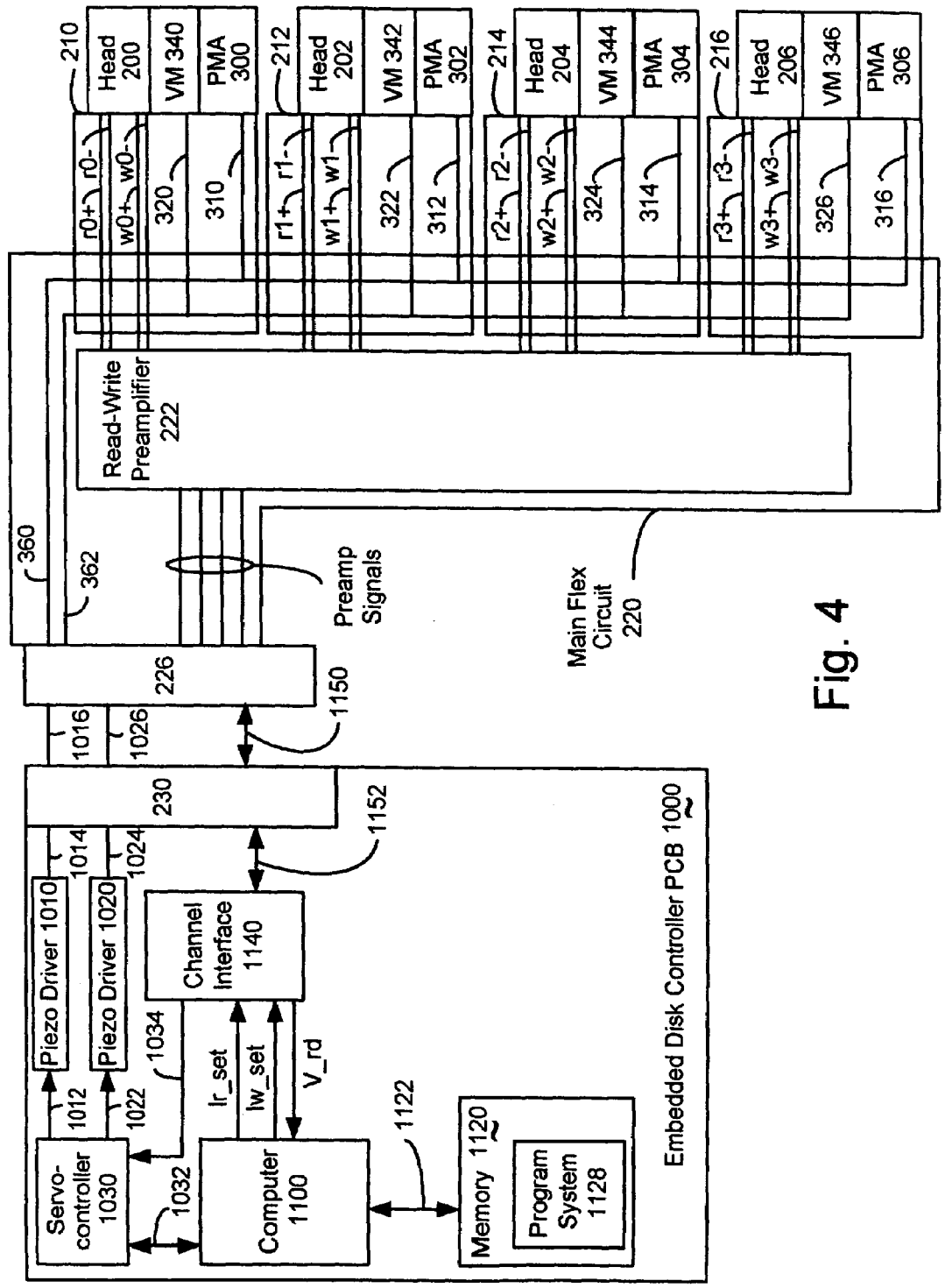
FIG. 4 shows a refinement of FIG. 3, where the bundles each have one active wire.
Figure 7:
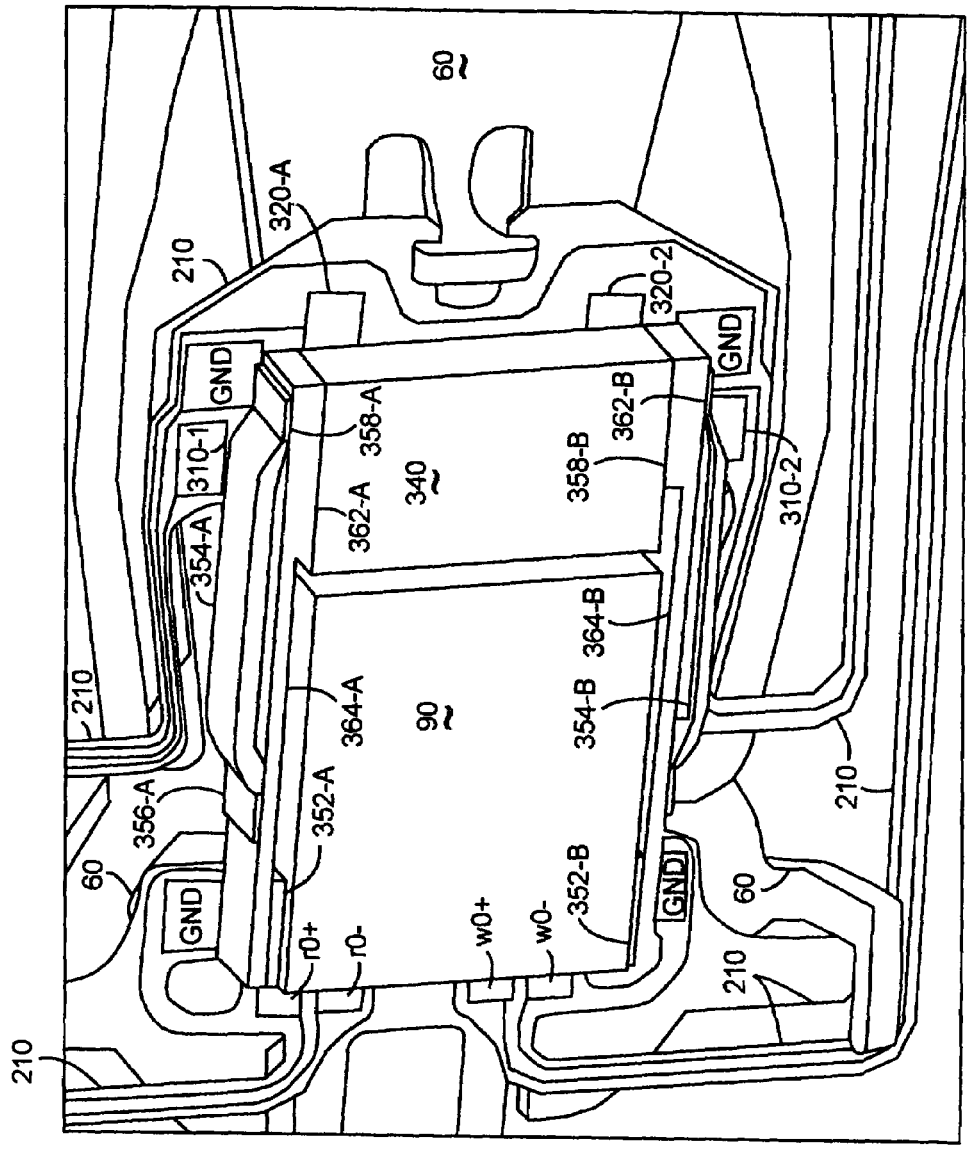
FIG. 7 shows a bottom perspective view of the head gimbal assembly of FIGS. 2A, 3 and 4 using a preferred micro-actuator assembly coupled with a slider as in FIG. 1B, 1D, and 2D.

The vertical micro-actuator 340 preferably includes two leads 320 in FIG. 3 and, more specifically, 320-1 and 320-2 in FIG. 7. Electrically stimulating the leads 320, provides the slider 90 with movement essentially perpendicular to the planar direction as indicated in FIGS. 1C–1F. It may be preferred that one of the vertical micro-actuator leads be tied to a common ground as indicated in FIG. 4. In a Head Gimbal Assembly (HGA) 60, the flexure 210 and/or the load beam preferably provide the common ground (GND), as in FIG. 7.

In simulation experiments, a potential difference of 40 volts between the two leads 320 of the vertical micro-actuator 340, provide the coupled slider 90 with a deflection of over 5 nanometers (nm). These simulation experiments are compatible with the micro-actuator assembly coupled with the slider 90 as shown in FIGS. 1B, 1D, 2D, 3, 4, and 7. These vertical deflections were confirmed for both the up direction of FIG. 1E and the down direction of FIG. 1F. These simulation experiments took into account the air bearing of the slider 90 interacting with the rotating disk surface 12 of FIG. 2C.

The planar micro-actuator 300 preferably includes two leads 310, which when electrically stimulated, provide the slider movement in the planar direction, as in FIGS. 2B and 2C.

When the planar micro-actuator 300 includes two planar micro-actuator arms 350-A and 350-B, as in FIGS. 1A, 1B, 2D, and 7, each of the two planar micro-actuator arms preferably has two leads. The leads of the planar micro-actuator arms preferably couple in parallel to the two leads 310 of the planar micro-actuator 300.

It is preferred that the micro-actuator arms 350-A and 350-B of FIGS. 1A–2A, 2D, and 7, each include a piezo-electric device as shown in FIGS. 2D and 7.

The micro-actuator arm 350-A includes the piezoelectric device 354-A in FIGS. 2D and 7. The piezoelectric device 354-A couples with a slider sleeve 364-A at a first coupling point 356-A and a second coupling point 358-A. These coupling points may serve to provide the leads to the piezoelectric device 354-A.

The micro-actuator arm 350-B includes the piezoelectric device 354-B in FIGS. 2D and 7. The piezoelectric device 354-B couples with a slider sleeve 364-B at a first coupling point 356-B and a second coupling point 358-B. These coupling points may serve to provide the leads to the piezoelectric device 354-B.

Preferably, the piezoelectric devices 354-A and/or 354-B of FIGS. 2D and 7, may further be multi-layer piezoelectric devices. Multi-layer piezoelectric devices are currently preferred because they currently have the least weight for mechanical force produced.

One skilled in the art will recognize that the planar micro-actuator arms 350-A and/or 350-B of FIGS. 2D and 7 may include, but are not limited to, other devices such as electrostatic and/or electromagnetic devices. One skilled in the art will recognize that the composition of the two micro-actuator arms may differ. Further, bulk piezoelectric devices may be included in the planar micro-actuator arms 350-A and/or 350-B.

The vertical micro-actuator 340 may include a thermoelectric device supporting the vertical slider movement.

FIG. 2A shows a head gimbal assembly 60 with the micro-actuator assembly of FIGS. 1A and 1C coupled with the slider 90 as in FIGS. 1B and 1D. A flexure 210 mechanically couples the micro-actuator assembly including 350-B, 352-B and 362-B with the slider 90. The read-write head 200 is embedded into a surface forming the bottom side of the slider 90.

FIG. 2B shows a bottom view of the slider 90 of FIGS. 1B, 1D, and 2A, with an alternative position for the read-write head 200. The slider 90 has a major axis 92 and a minor axis 94. Planar movement of the slider 90 is principally in terms of the major axis 92 and the minor axis 94.

The invention operates as follows: the vertical micro-actuator 340 is excited when its two leads experience a voltage difference. When the vertical micro-actuator 340 is excited, it bends, lifting the planar micro-actuator arm 350-B, as in FIG. 1E or lowering the planar micro-actuator arm 350-B as in FIG. 1F. This bending alters the flying height of the slider 90 and the read-write head 200.

The invention includes the voice coil actuator shown in FIG. 2C built with the flex circuitry 220 and the head gimbal assemblies 60–66. The invention also includes the hard disk drive 10 built with the voice coil actuator. The voice coil actuator includes an assembly of at least one actuator arm 50, and as shown, additional actuator arms 52, 54 and 56. A disk surface 12 is shown, which when the invention is in operation, rotates about spindle 80.

The preamplifier 222 of FIGS. 2C, 3, and 4, along with the coupling of the preamplifier to the differential read and write signals through the flexures 210–216, is one of the main constraints for the main flex circuit 220. These constraints impact many of the components of the voice coil assembly as shown in FIG. 2C.

Figure 5:
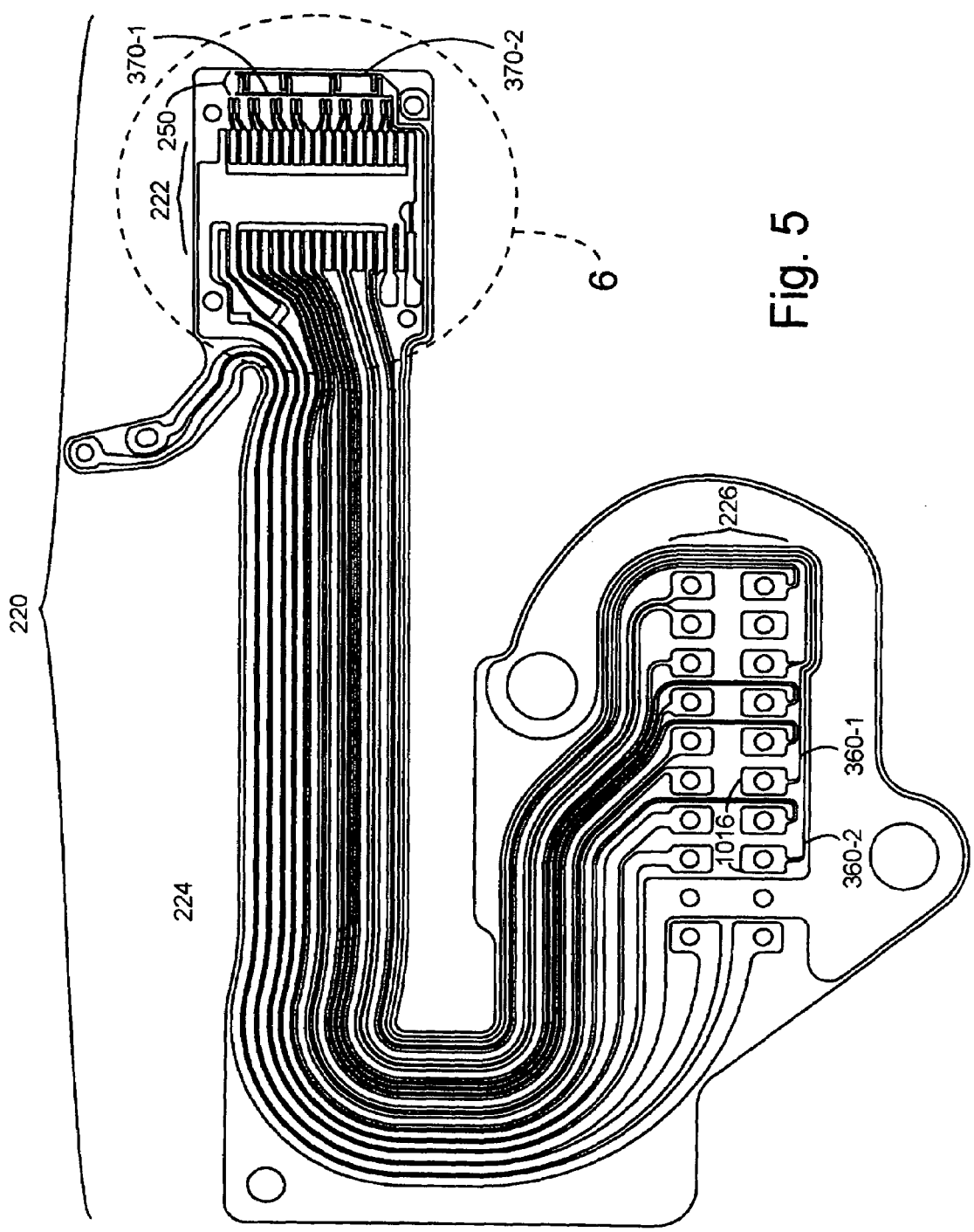
FIG. 5 shows a preferred embodiment of the main flex circuit of FIGS. 2C and 4.
Figure 6:
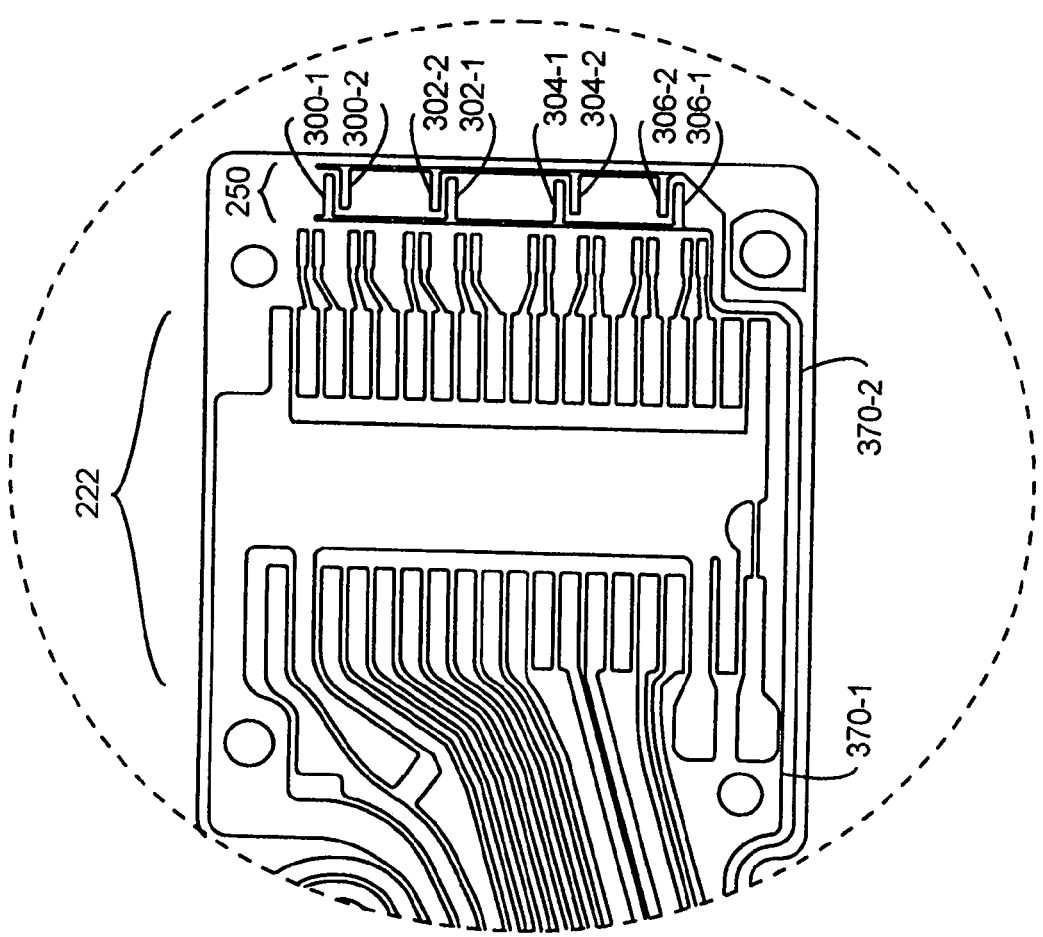
FIG. 6 shows an enlargement of the region of the main flex circuit of FIG. 5 housing the preamplifier and providing the coupling interface to the flexures.

The main flex circuit 220 of FIGS. 2C, and 3–5, includes a ribbon cable socket 226, providing preamplifier signals to a read-write preamplifier site 222. The ribbon cable socket 226 is coupled via flex region 224 to the read-write preamplifier site 222 and a bridge coupling region 250, as shown in FIGS. 5 and 6. The ribbon cable socket 226 provides a piezo control bundle 362, which is shared with the piezo control bundles 320–326 of the flexures 210–216.

The piezo control bundle 320 stimulates the leads of a vertical micro-actuator 340 to trigger the piezoelectric effect in FIGS. 3–5. Similarly, the micro-actuator control bundle 310 stimulates the leads in the planar micro-actuator 300 to trigger the piezoelectric effect by the planar micro-actuator. When implementing a single wire approach, as in FIG. 4, the bundles have one wire. When using a two wire approach, as in FIG. 3, the bundles have two wires. While not shown, the vertical micro-actuators may preferably employ a different approach than the planar micro-actuators.

The invention includes a communication mechanism shown in FIGS. 3 and 4, between the servo-controller 1030 and the vertical micro-actuators 340–346, which alter the flying height of their read-write heads 200–206. The communication mechanism includes a main flex circuit 220 receiving a control wire bundle 1024 via ribbon cable bundle 1026. The ribbon cable bundle 1026 is received at the ribbon cable connector 226 to create the signal states on the piezo control bundle 362 in the main flex circuit 220. The piezo control bundle 362 is shared through the flexures 210–216. The communication mechanism further includes the main flex circuit 220 coupled with at least two of the flexures 210–216.

In FIG. 3, the piezo control bundle 362 involves two wires carrying active signals. In FIG. 4, the piezo control bundle 362 involves just one wire carrying an active signal. In FIG. 4, the second lead of the vertical micro-actuators 340–346 are tied to a shared ground shown in FIG. 7.

Vertical micro-actuator 340 alters the flying height of the read-write head 200 by raising and lowering the planar micro-actuator arms as shown in FIGS. 1E and 1F. The flexure 210 couples the vertical micro-actuator 340 and the read-write head 200 to the main flex circuit 220. This includes coupling the piezo control bundle 362 of the main flex circuit 220 to the piezo control bundle 320 for the vertical micro-actuator 340.

Similarly, flexure 212 couples the piezo control bundle 362 to the piezo control bundle 322 for the vertical micro-actuator 342, in FIGS. 3 and 4. Flexure 214 couples the piezo control bundle 362 to the piezo control bundle 324 for the vertical micro-actuator 344. The flexure 216 couples the piezo control bundle 362 to the piezo control bundle 326 for the vertical micro-actuator 346.

In FIGS. 3 and 4, the servo-controller 1030 controls 1022 the piezo driver 1020, which drives the wire bundle 1024, in the embedded disk controller printed circuit board 1000. The wire bundle 1024 connects to a ribbon cable connector 230. The ribbon cable connector 230 connects via a ribbon cable 1150 to a ribbon cable connector 226 of the main flex circuit 220. Ribbon cable 1150 includes a wire bundle 1026, which interconnects wire bundle 1024 with the piezo control bundle 362, in the main flex circuit 220.

When the invention is in operation, and the hard disk drive is accessing a disk surface, all the vertical micro-actuators 340–346 may or may not perform the same action on their respective read-write heads. This insures proper flying height for the read-write head in the slider above the accessed disk surface. This also minimizes the consequences to the other voice coil actuator components. By sharing the control bundle, the coupling region 250 of the main flex circuit 220 maintains essentially the same shape and area.

The flexure 210 of FIG. 7 also provides contacts for a slider containing the read-write head for the read differential signal pair, and the write differential signal pair, as r0+, r0−, w0+, and w0−. One skilled in the art will recognize that the exact order of these signal contacts will vary with different implementations, and any ordering is potentially preferred as the situation varies.

The flexure 210 of FIG. 7 also provides contacts for the piezo control bundle to the planar micro-actuator 300 as 300-1 and 300-2.

The invention includes the flex circuit assembly of the main flex circuit 220 coupling with at least one of the flexures 210–216, as in FIGS. 3 and 4. The making of the flex circuit assembly includes the following steps. The flexures 210 and 212, each with a test strip, are probed to confirm the connectivity of the flexure. The test strip is then removed to create the flexure 210 by cutting at a cleavage line. Each of the flexures, 210–216, are positioned with the bridge coupling region 250 of the main flex circuit 220 of FIGS. 5 and 6. The aligned assembly of the main flex circuit and the flexures are reflow soldered to create the shared coupling of the piezo control bundle 362.

The other components of the main flex circuit 220 include a preamplifier 222 and a ribbon cable socket 226, as well as passive components, which may include capacitors and resistors. These other components of the main flex circuit 220 may be soldered to the main flex circuit 220 before, during, or after, the flexures 210–216.

Making the voice coil actuator of FIG. 2C includes the following steps. The flex circuit assembly of FIGS. 3 and 4, is assembled with the head gimbal assemblies 60–66 and the actuator arms 50–56. The head gimbal assemblies 60–66 include the vertical micro-actuators 340–346, which are electrically coupled with the respective leads 320-1 and 320-2 of the flexures 210–216. This coupling shares the piezo control bundle 362 of the main flex circuit 220 with the piezoelectric control bundles 320–326 of the flexures 210–216. A one wire approach to coupling the vertical micro-actuator will tie one of the leads to a common ground GND.

The voice coil actuator, the ribbon cable 1150, and the embedded disk controller printed circuit board 1000 of FIGS. 3 and 4, are assembled to make the hard disk drive 10. The ribbon cable 1150 is coupled to the ribbon cable site 226 and the ribbon cable site 230. The ribbon cable site 226 is on the main flex circuit 220. The ribbon cable site 230 is on the embedded disk controller printed circuit board 1000. The ribbon cable 1150 includes the coupling 1026 between a control signal bundle 1024 generated by the piezo driver 1020 and the shared piezo control bundle 362 of the main flex circuit 220. The piezo driver 1020 is controlled by the servo-controller 1030, which receives feedback 1034 from the channel interface 1140.

The piezo driver 1020 of FIGS. 3 and 4 often includes a Digital to Analog Converter (DAC) providing an initial analog signal, which is often amplified and filtered to generate the states of the control signal bundle 1024. The servo-controller 1030 may control 1012 the piezo driver 1020 by controlling the output of the DAC, the amplification gain, and/or the filter parameters. Alternatively, the filtering may be a fixed network preferably containing a combination of resistors, capacitors, and possibly inductors. The amplification may be from a preset amplifier or fixed function driver circuit, or from a programmable gain amplifier.

The piezo driver 1010 of FIGS. 3 and 4 has a similar structure to the piezo driver 1020. In certain embodiments, these circuits may be very similar. In certain alternative embodiments, they may differ in operation, as when one of them supports a one wire approach and the other supports a two wire approach.

In certain preferred embodiments, at least one of the piezo drivers 1010 and 1020 may be able to establish a voltage difference between plus forty volts and minus forty volts.

The feedback 1034 of FIGS. 3 and 4 often includes a Position Error Signal(PES) measured and/or estimated at least partly by the channel interface 1140. The channel interface 1140 uses the preamplifier signals of the read-write preamplifier 222, which are part of the couplings provided by ribbon cable 1150. The control of the read-write preamplifier 222 is determined at least in part by the setting of a read bias current Ir_set and a write bias current Iw_set. The determined read channel voltage V_rd of the selected read differential signal pair, generated by the read-write head over the accessed track on the rotating disk surface, is provided by the channel interface 1140. These controls are made, and the read channel voltage is received, by a computer 1100. The computer 1100 accesses 1122 a program system 1128, residing in a memory 1120 to implement the overall operation of the hard disk drive 10. The computer 1100 further directs 1032 the servo-controller 1030 in its real-time operations, which may entail operational, initialization and/or calibration activities.

The invention also applies to hard disk drives 10 with at least two disk surfaces supplied with planar micro-actuators 300–306 to aid in positioning the read-write heads 200–206, as in FIGS. 3 and 4. The planar micro-actuators are located near the read-write heads of the head gimbal assemblies 60–66 as shown in FIG. 7. The ribbon cable socket 226 of FIGS. 3 and 4, also provides a source control bundle 360, shared with the control wire bundles 310–316 of the flexures 210–216.

The invention further includes a communication mechanism shown in FIGS. 3 and 4, between the servo-controller 1030 and the planar micro-actuators 300–306, which position the multiple read-write heads 200–206. The communication mechanism includes a main flex circuit 220 receiving a control wire bundle 1014 via ribbon cable bundle 1016. The ribbon cable bundle 1016 is received at ribbon cable connector 226 to create the signal states on the source control bundle 360 in the main flex circuit 220. The source control bundle 360 is shared with the micro-actuator control bundles 310–316 through the flexures 210–216.

In FIG. 3, the source control bundle 360 uses two wires carrying active signals. In FIG. 4, the source control bundle 360 uses just one wire carrying an active signal. In FIG. 4, each of the planar micro-actuators 300–306 has its second lead tied to a shared ground.

The planar micro-actuator 300 positions the read-write head 200 in FIGS. 3 and 4. The flexure 210 couples the micro-actuator 300 and the read-write head 200 to the main flex circuit 220. This includes coupling the source control bundle 360 of the main flex circuit 220 to the micro-actuator control bundle 310 for the planar micro-actuator 300.

Similarly, flexure 212 couples the source control bundle 360 to the micro-actuator control bundle 312 for the planar micro-actuator 302, in FIGS. 3 and 4. Flexure 214 couples the source control bundle 360 to the micro-actuator control bundle 314 for the planar micro-actuator 304. The flexure 216 couples the source control bundle 360 to the micro-actuator control bundle 316 for the planar micro-actuator 306.

In FIGS. 3 and 4, the servo-controller 1030 controls 1012 the piezo driver 1010, which drives wire bundle 1014, in the embedded disk controller printed circuit board 1000. The wire bundle 1014 connects to a ribbon cable connector 230. The ribbon cable connector 230 connects via a ribbon cable 1150 to the ribbon cable connector 226 of the main flex circuit 220. The ribbon cable 1150 includes a wire bundle 1016, which interconnects the wire bundle 1014 with the source control bundle 360, in the main flex circuit 220.

When the invention is operating, and the hard disk drive is accessing a disk surface, all the planar micro-actuators 300–306 perform the same positioning action on their respective read-write heads, while the vertical micro-actuators control the flying height. This insures proper positioning of the read-write head in the slider above the accessed disk surface. By sharing the control bundle 360, the coupling region 250 of the main flex circuit 220 maintain essentially the same shape and area.

The invention offers the advantages of using micro-actuators for each surface of a multiple surface, hard disk drive, in which the micro-actuators include the ability to position within three dimensions. By not disrupting the overall design of the voice coil actuator, the invention promotes cost efficiencies. The invention further promotes reliability by allowing the use of voice coil actuator components already in production. Using the micro-actuators increases the servo bandwidth from about 1.1 K Hz to over 2.6 K Hz.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A micro-actuator assembly for use coupling a slider in a head gimbal assembly, comprising:
    a planar micro-actuator providing at least one planar micro-actuator arm for coupling to said slider; and
    a vertical micro-actuator coupling with said planar micro-actuator arm; wherein said vertical micro-actuator includes a vertical lead pair;
    wherein said vertical lead pairs receiving an electrical stimulus creates a movement of said slider through said planar micro-actuator arm in a vertical direction; wherein said vertical direction is essentially perpendicular to said rotating disk surface;
    wherein said planar micro-actuator arm supports movement through said coupling of said slider in a planar direction; and wherein said planar direction is essentially parallel to said rotating disk surface included in a hard disk drive.

2. The apparatus of claim 1, wherein said planar micro-actuator provides a first planar micro-actuator arm and a second micro-actuator arm, both for coupling to said slider.

3. The apparatus of claim 2, wherein said planar micro-actuator provides said first planar micro-actuator arm and said second micro-actuator arm, both support said movement of said slider in said planar direction.

4. The apparatus of claim 3, wherein at least one of said first planar micro-actuator arm and said second planar micro-actuator arm includes a piezoelectric device.

5. The apparatus of claim 4, wherein said first planar micro-actuator arm includes a first of said piezoelectric devices;
    wherein said second planar micro-actuator arm includes a second of said piezoelectric devices.

6. The apparatus of claim 5, wherein said first planar micro-actuator arm includes said first piezoelectric device coupling to a first of a slider sleeve containing a first of said coupling to said slider;
    wherein said second planar micro-actuator arm includes said second piezoelectric device coupling to a second of said slider sleeves contain a second of said couplings to said slider.

7. The apparatus of claim 3, wherein said first planar micro-actuator arm is electrically coupled in parallel to said second planar micro-actuator arm.

8. The apparatus of claim 3, wherein said first planar micro-actuator arm is electrically coupled in parallel to said second planar micro-actuator arm to support said movement of said slider in said planar direction when an electrical stimulus is supplied to said electrical coupling of said first planar micro-actuator arm and said second planar micro-actuator arms.

9. The apparatus of claim 3, wherein said first planar micro-actuator arm is electrically coupled in parallel to said second planar micro-actuator arm.

10. A head gimbal assembly (HGA), comprising said micro-actuator assembly of claim 1 coupled with said slider using said planar micro-actuator arm and using a coupled flexure to provide said electrical stimulus received by said vertical micro-actuator.

11. An actuator arm mechanically coupling to said head gimbal assembly of claim 10.

12. An voice coil actuator assembly, including:
    at least one of said actuator arms of claim 11; and
    a main flex circuit electrically coupling said flexure included in said actuator arm to provide said electrical stimulus received by said vertical micro-actuator.

13. A hard disk drive, comprising:
    said voice coil actuator assembly of claim 12; and
    an embedded disk controller printed circuit board electrically coupling with said main flex circuit to further provide said electrical stimulus received by said vertical micro-actuator.

14. A method of making a head gimbal assembly (HGA), comprising the steps of:
    coupling a micro-actuator assembly with a slider using a planar micro-actuator arm and using a coupled flexure to provide said electrical stimulus received by a vertical micro-actuator;
    wherein said micro-actuator assembly, includes:
    a planar micro-actuator providing said planar micro-actuator arm; and
    said vertical micro-actuator coupled with said planar micro-actuator arm; wherein said vertical micro-actuator includes a vertical lead pair;
    wherein said vertical lead pairs receiving said electrical stimulus creates a movement of said slider through said planar micro-actuator arm in a vertical direction; wherein said vertical direction is essentially perpendicular to said rotating disk surface;
    wherein said planar micro-actuator arm supports movement through said coupling of said slider in a planar direction; and wherein said planar direction is essentially parallel to said rotating disk surface included in a hard disk drive.

15. The method of claim 14, wherein the step coupling said micro-actuator assembly to said slider is further comprised of the steps of:
    coupling said slider using said first planar micro-actuator arm;
    coupling said slider using said second planar micro-actuator arm.

16. The method of claim 15, wherein said planar micro-actuator provides said first planar micro-actuator arm and said second micro-actuator arm, both support said movement of said slider in said planar direction.

17. The method of claim 16, wherein at least one of said first planar micro-actuator arm and said second planar micro-actuator arm includes a piezoelectric device.

18. The method of claim 17, wherein said first planar micro-actuator arm includes a first of said piezoelectric devices;
wherein said second planar micro-actuator arm includes a second of said piezoelectric devices.

19. The method of claim 18, wherein the step coupling said slider using said first planar micro-actuator arm is further comprised of the step of:
coupling said slider to a first of a slider sleeve; wherein said first piezoelectric device is coupled to said first slider sleeve; and
wherein the step coupling said slider using said second planar micro-actuator arm is further comprised of the step of:
coupling said slider to a second of a slider sleeve; wherein said second piezoelectric device is coupled to said second slider sleeve.

20. The method of claim 16, wherein said first planar micro-actuator arm is electrically coupled in parallel to said second planar micro-actuator arm.

21. The method of claim 16, wherein said first planar micro-actuator arm is electrically coupled in parallel to said second planar micro-actuator arm to support said movement of said slider in said planar direction when an electrical stimulus is supplied to said electrical coupling of said first planar micro-actuator arm and said second planar micro-actuator arms.

22. The method of claim 16, wherein said first planar micro-actuator arm is electrically coupled in parallel to said second planar micro-actuator arm.

23. A method of making an actuator arm, comprising the step of mechanically coupling said actuator arm to said head gimbal assembly of claim 14.

24. Said actuator arm as a product of the process of claim 23.

25. A method of making a voice coil actuator assembly, comprising the step of:
electrically a main flex circuit electrically coupling said flexure included in said actuator arm of claim 23 to provide said electrical stimulus received by said vertical micro-actuator.

26. Said voice coil actuator assembly as a product of the process of claim 25.

27. A method of making a hard disk drive, comprising the step of:
electrically coupling an embedded disk controller printed circuit board electrically coupling with said main flex circuit of claim 25 to further provide said electrical stimulus is received by said vertical micro-actuator.

28. Said hard disk drive, as a product of the process of claim 27.

* * * * *